(12) United States Patent
Baca et al.

(10) Patent No.: US 7,129,194 B2
(45) Date of Patent: Oct. 31, 2006

(54) CATALYST SYSTEM WITH IMPROVED CORROSION RESISTANCE

(75) Inventors: Adra S. Baca, Corning, NY (US); Lin He, Horseheads, NY (US); Youchun Shi, Horseheads, NY (US); Charles M. Sorensen, Jr., Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 10/948,996

(22) Filed: Sep. 23, 2004

(65) Prior Publication Data

US 2006/0063665 A1    Mar. 23, 2006

(51) Int. Cl.
*B01J 23/00*    (2006.01)
*B01J 21/04*    (2006.01)
*B32B 15/04*    (2006.01)
*B21D 39/00*    (2006.01)
*C25D 5/10*    (2006.01)

(52) U.S. Cl. ............... 502/300; 502/439; 502/527.11; 502/527.19; 502/527.12; 502/527.24; 428/457; 428/469; 428/472; 428/403; 428/593; 428/615; 428/621; 428/622; 428/623; 428/116; 428/628; 428/632; 428/634; 428/655; 428/660; 428/661; 428/662; 428/663; 428/664; 428/668; 428/671

(58) Field of Classification Search .............. 502/300, 502/439, 527.11, 527.19, 527.12, 527.24; 428/457, 469, 472, 403, 593, 615, 621–623, 428/116, 628, 629, 632, 634, 655, 660–664, 428/668, 671
See application file for complete search history.

(56) References Cited

U.S. PATENT DOCUMENTS

| | | | |
|---|---|---|---|
| 3,925,259 A * | 12/1975 | Kane | 502/315 |
| 4,267,210 A * | 5/1981 | Yajima et al. | 427/226 |
| 4,685,427 A * | 8/1987 | Tassen et al. | 122/511 |
| 5,204,302 A * | 4/1993 | Gorynin et al. | 502/2 |
| 5,635,438 A | 6/1997 | Cowfer et al. | |
| 5,985,220 A * | 11/1999 | Hughes | 422/177 |
| 5,986,152 A | 11/1999 | Muller et al. | |
| 6,358,636 B1 * | 3/2002 | Yang et al. | 428/833.2 |
| 6,440,895 B1 * | 8/2002 | Tonkovich et al. | 502/439 |
| 6,616,905 B1 * | 9/2003 | Kawamura et al. | 423/244.01 |
| 6,616,909 B1 | 9/2003 | Tonkovich et al. | |
| 6,716,339 B1 | 4/2004 | Liu et al. | |
| 6,762,149 B1 | 7/2004 | Tonkovich et al. | |
| 6,770,765 B1 | 8/2004 | Weisbeck et al. | |
| 2004/0001966 A1 * | 1/2004 | Subramanian et al. | 428/679 |

* cited by examiner

*Primary Examiner*—David Sample
*Assistant Examiner*—Patricia L. Hailey
(74) *Attorney, Agent, or Firm*—Kees van der Sterre

(57) ABSTRACT

An improved catalyst system that includes a metal support structure and an anti-corrosive layer on the metal support structure, and has improved resistance to corrosion and other degradation under corrosive environments. Typically, a catalyst supporting layer is applied over the anti-corrosive layer.

7 Claims, 1 Drawing Sheet

CATALYST SYSTEM WITH IMPROVED CORROSION RESISTANCE

BACKGROUND OF THE INVENTION

The present invention pertains to catalyst systems having improved resistance under a corrosive environment, and more particularly to catalyst systems including a metal support structure with an anti-corrosive coating.

In chemical industry reactors, metallic catalyst support structures are preferred over inorganic (e.g., ceramic) catalyst supports because they exhibit high intrinsic thermal conductivity. Preferred metallic catalyst supports are comprised of copper. One problem which still remains is corrosion and degradation of the metallic catalyst support under certain chemical reactions.

For example, reactions involving oxidizing acids, such as nitric acid and sulfuric acid, and acids containing Fe(III), which come into contact with the copper catalyst supports cause the copper to dissolve. Copper is also subject to oxidation when it is contacted with solutions containing Fe(III), Hg(II), Sn(IV), Cu(II), and other ions that are readily susceptible of reduction, as well as ammonia ions or substituted ammonia ions. As another example, chloride, cyanide, and ammonia can form complexes with copper. Hydrogen chloride, hydrogen fluoride, as well as many halogenated hydrocarbons, can also react with copper to cause corrosion.

Contacting of a metallic support structure with corrosive agents in a thermal chemical reactor will result in the eventual destruction of the catalyst system, deterioration of production yields, and may require frequent replacement of the catalyst system, which could be prohibitively expensive. Additionally, exposure of highly conductive metallic supports to certain chemical reaction conditions can lead to undesired side-reactions because the metal support may have catalytic activity for by-product formation.

Accordingly, it would be desirable to provide a catalyst system having a metallic support that has a high intrinsic thermal conductivity, but which is not susceptible to corrosion and/or other deterioration due to contact with the chemical reactants, or that contributes to undesirable side reactions.

SUMMARY OF THE INVENTION

The invention relates to a catalyst system utilizing a metallic catalyst support structure with improved resistance to corrosion or other degradation that may occur upon contact of the metallic catalyst support with corrosive reactants or reagents. The metallic catalyst support structure maintains a high intrinsic thermal conductivity which reduces heat transfer limitations.

The catalyst systems of the invention can be used in chemical industry reactors for catalytic oxychlorination of ethylene with hydrochloric acid and oxygen, as well ethylene oxide reactions. Specifically, the catalyst systems include a metal catalyst support and an anti-corrosive layer on the metal catalyst support. The anti-corrosive layer itself may function as a catalyst for certain types of chemical reactions. Typically, a catalyst supporting layer is applied over the anti-corrosion layer. The metal catalyst support structure is characterized by a high surface area such as needed for use in the chemical reactions described above. In one embodiment the metal support is a multicellular monolith, but it is not limited to such. A preferred multicellular monolith is a honeycomb structure which has a high surface area.

Additional features and advantages of the invention will be set forth in the detailed description which follows and will be apparent to those skilled in the art from the description or recognized by practicing the invention as described in the description which follows together with the claims and appended drawings.

DETAILED DESCRIPTION OF THE PREFERRED EMBODIMENT

The catalyst system according to the invention includes a metal catalyst support structure and an anti-corrosive layer on metal catalyst support structure. A catalyst supporting layer may be applied on top of the anti-corrosive coating on which catalysts can be loaded. The catalyst systems according to the invention have a metal substrate or support structure.

The metal catalyst support structure is comprised of metals which have substantially high intrinsic thermal conductivity, with specific examples including copper and copper alloys, aluminum and aluminum alloys, and iron and iron alloys (e.g., steel). In one embodiment the metal catalyst support is a copper metal support.

Figure 1:
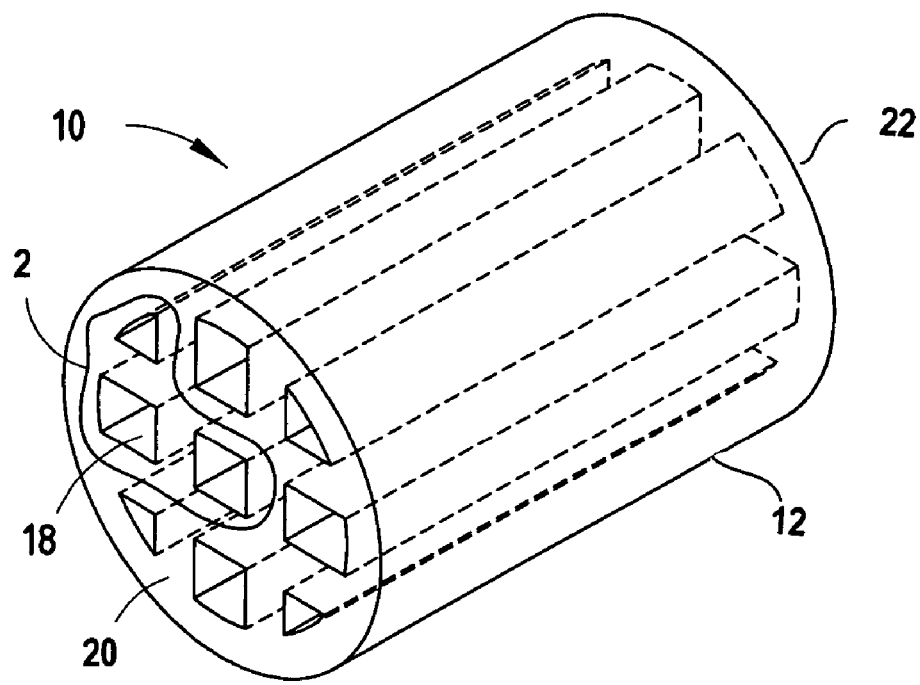
FIG. 1 is a schematic perspective view of a catalyst system according to the present invention in which the catalyst support structure is a multicellular monolith-shaped body (e.g., a honeycomb structure) that defines a plurality of cell channels extending between opposing faces; and, FIG. 2 is an enlarged view of a portion of the catalyst system in FIG. 1.

The metal support structure may be in any of various forms which provide a high surface area for chemical reactions. In one embodiment the metal support structure is a multicellular monolith. FIG. 1 shows a catalyst system 10 according to the present invention having a multicellular monolith support structure in the form of a honeycomb structure 12. Honeycomb structure 12 has an inlet end 20 and an outlet end 22 which are opposite of each other, and a plurality of passageways or cell channels 18 extending between the two ends, the cell channels having porous walls. The features and advantages of the invention are not limited by, and are not particularly dependent upon, the size and/or shape of the metal substrate.

Figure 2:
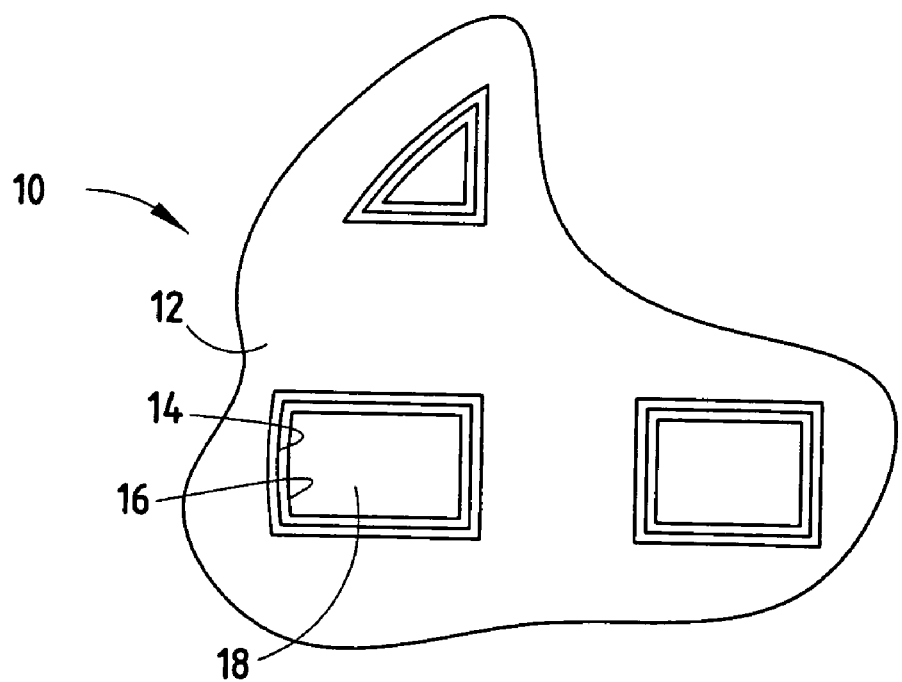

FIG. 2 shows an enlarge view of the catalyst system 10 of FIG. 1. Presented is a portion of honeycomb catalyst support 12 with channels 18. The inside of the cell channels 18 are coated with an anti-corrosion layer 14. Typically for most reactions, a catalyst support layer 16 containing a catalytically active substance is deposited over layer 14.

The selection of a suitable anti-corrosive layer is dependent on the particular chemical reaction that is being catalyzed, and more specifically on the reaction conditions, including temperature, pressure, and the presence of corrosive or other degradative reactants, reagents or products that may come into contact with the heterogeneous catalyst system. Organic coatings, such as polymer coatings, may function as a suitable anti-corrosive layer for reactions that are carried out at relatively mild conditions (e.g., at relatively low temperatures, and in the absence of materials that could either degrade or permeate the organic coating).

Another suitable class of anti-corrosive coatings comprises noble metals (i.e., metals that are substantially inert under most conditions, and especially under the reaction conditions). Examples of suitable noble metals are iridium and platinum. Other metals such as tantalum and its alloys can also be used as anti-corrosive coatings. However, a disadvantage with noble metals and tantalum is that they are relatively expensive. Nickel, nickel alloys, chromium and chromium alloys are resistant to corrosion at low temperatures (e.g., less than about 50° C.), relatively low hydrochloric acid concentrations (e.g., less than about 5%) in aqueous media, and in gas phase without moisture. Accordingly, nickel, nickel alloys, chromium and chromium alloys are useful anti-corrosive coatings for certain reaction processes.

Silicon and its alloys are excellent anti-corrosive materials, and are especially useful for preventing corrosion from hydrochloric acid.

Silica ($SiO_2$) and titania ($TiO_2$) are very resistant to corrosion effects under acidic conditions. Zirconia ($ZrO_2$) also is resistant to corrosion and/or degradation effects under alkaline conditions. Ceramic and glass coatings comprising $SiO_2$, $TiO_2$ and/or $ZrO_2$ as main (greater than 50%) components exhibit excellent anti-corrosion properties for many reaction conditions.

Silicon carbide (SiC), silicon nitride ($Si_3N_4$), boron silicide ($B_4Si_3$), and boron carbide ($B_4C_3$) provide excellent corrosion resistance in almost all media, and also have a relatively high thermal conductivity. Alumina ($Al_2O_3$) is also suitable.

Carbon is also a suitable material for the anti-corrosive coating of the present invention. Except for burning at high temperature in air or oxygen, carbon is very inert under almost all other corrosive conditions, such as acid, base and oxidizing solution/gas, and is therefore suitable as an anti-corrosive layer for many chemical reaction processes.

In addition to reaction conditions, anti-corrosive coating selection should involve consideration of coating thickness and the thermal conductivity of the coating. To prevent corrosion and/or other types of degradation of the metal substrate it is desirable to completely cover the metal substrate with the anti-degradation layer. It is generally easy to obtain complete coverage by applying a relatively thick coating. However, when the coating becomes too thick, the advantages of the relatively high thermal conductivity of the metal substrate is diminished. Accordingly, coating techniques that facilitate complete coverage of the substrate with a relatively thin film are preferred. A carbon film coating may be applied by dip-coating the substrate with a polymer coating and carbonizing the polymer coating. Other deposition techniques include radio frequency (RF) sputtering and chemical vapor deposition (CVD).

Electrophoretic deposition may be employed for inorganic coating materials such as $TiO_2$, $SiO_2$, $Al_2O_3$, $ZrO_2$, SiC, $Si_3N_4$, $B_4Si_3$, $B_4C_3$ or a combination thereof. Such techniques may be employed for applying relatively thin films having a thickness of less than 0.1 micrometers. However, solution deposition methods (e.g., dip-coating) are more economical. Typically, an anti-degradation coating thickness of from about 0.005 to 50 µm (micrometers) is preferred, and a thickness of from about 0.01 to 10 µm (microns) is more preferred.

In certain cases for particular types of chemical reactions, the anti-corrosive layer may also function as a catalyst support layer or even as a catalyst. However, typically, especially for copper metal support structures a catalyst supporting layer is preferably deposited over the anti-corrosive layer, on which then catalysts, such as noble and/or base metals, can be loaded. Catalyst support layers include gamma-alumina, theta-alumina, eta-alumina, alpha-alumina, silica, calcium aluminate, titania, zirconia, magnesium oxide, zeolites, and mixtures of these. Coating techniques such as dip-coating, or others known in the art may be employed to apply the catalyst supporting layer A specific application of the invention is described in the following non-limiting, illustrative example.

EXAMPLE

Polyvinyl chloride (PVC) is a commercially important, high volume product, that is prepared by polymerization of vinyl chloride monomer. Vinyl chloride is produced by catalytic oxychlorination of ethylene with hydrochloric acid and oxygen. The reaction is typically catalyzed using $CuCl_2$ as the catalyst. The normal reaction conditions are from about 210° C to about 260° C and from about 5 to about 6 atmospheres, with air and oxygen. The reaction is exothermic. By utilizing a copper monolith support structure in accordance with the invention, heat transfer is improved. However, the large amount of oxygen and hydrogen chloride would cause rapid corrosion of an unprotected copper substrate, i.e., a copper support that is not provided with an anti-corrosive layer in accordance with the invention. However, by providing the copper monolith support structure with an appropriate anti-corrosive layer, and a catalyst supporting layer, it is anticipated that improved heat transfer, improved reaction kinetics, and higher productivity can be achieved without degradation of the heterogeneous catalyst system due to corrosion of the copper substrate.

It will become apparent to those skilled in the art that various modifications to the preferred embodiment of the invention as described herein can be made without departing from the spirit or scope of the invention as defined by the appended claims.

The invention claimed is:

1. A catalyst system comprising:
   a metal honeycomb support structure; and,
   an anti-corrosive layer on the metal honeycomb support structure; and a catalyst supported by the metal honeycomb support structure and anti-corrosive layer, wherein the and-corrosive layer is carbon.

2. The catalyst system of claim 1, further comprising a catalyst supporting layer on the anti-corrosive layer.

3. The catalyst system of claim 1, wherein the metal support structure comprises copper.

4. The catalyst system of claim 1, wherein the anti-corrosive layer is resistant to corrosion by a substance selected from the group consisting of sulfuric acid, hydrochloric acid, nitric acid, ammonia, cyanides, sulfides, metal ions, hydrofluoric acid, fluorine, chlorine, carbon monoxide, and carbon dioxide.

5. The catalyst system of claim 1, wherein the anti-corrosive layer is resistant to corrosion by metal ions.

6. The catalyst system of claim 1, wherein the anti-corrosive layer has a thickness of from about 0.005 µm to about 50 µm.

7. The catalyst system of claim 6, wherein the anti-corrosive layer has a thickness of from about 0.01 µm to about 10 µm.

* * * * *